A. A. EWALD.
FOOT ACCELERATOR.
APPLICATION FILED FEB. 10, 1916.
1,204,553.
Patented Nov. 14, 1916.
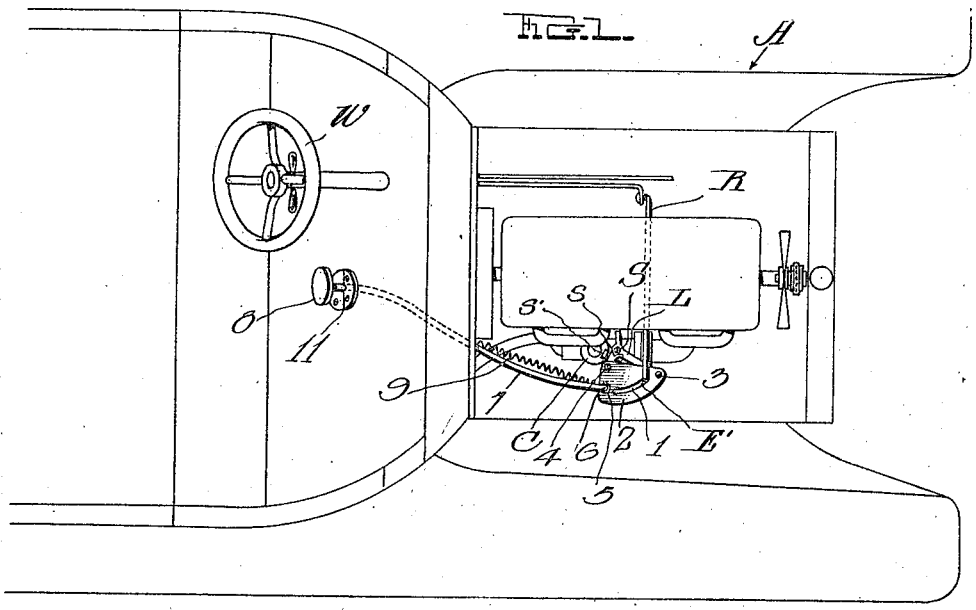
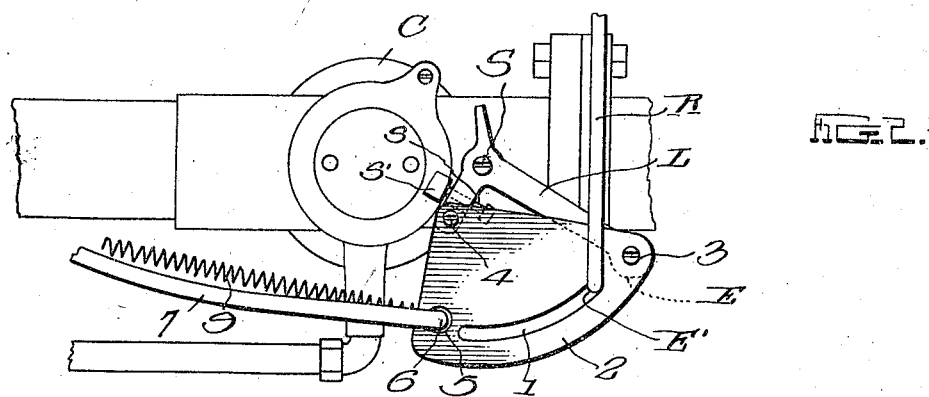
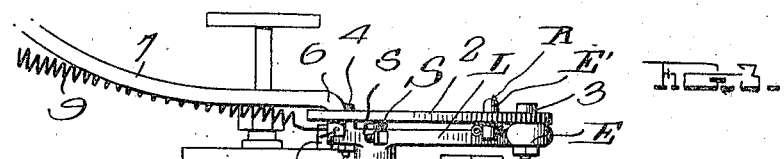
Witnesses
H. Woodard
Inventor
Arno A. Ewald
by H. R. Wilson & Co.
Attorneys

UNITED STATES PATENT OFFICE.

ARNO A. EWALD, OF OAKFIELD, WISCONSIN.

FOOT-ACCELERATOR.

1,204,553.  Specification of Letters Patent.  Patented Nov. 14, 1916.

Application filed February 10, 1916.  Serial No. 77,462.

*To all whom it may concern:*

Be it known that I, ARNO A. EWALD, a citizen of the United States, residing at Oakfield, in the county of Fond du Lac and State of Wisconsin, have invented certain new and useful Improvements in Foot-Accelerators; and I do declare the following to be a full, clear, and exact description of the invention, such as will enable others skilled in the art to which it appertains to make and use the same.

My invention is an improved type of foot accelerator for motor vehicles, the present embodiment of the device being designed primarily for use on Ford automobiles, although its application need not be limited thereto.

The object of the invention is to provide a simple and inexpensive accelerator which may be readily applied to use without changing the parts of the automobile with which it coöperates.

With this general object in view, the improvements reside in certain novel features of construction and in unique combinations of parts to be hereinafter fully described and claimed, the descriptive matter being supplemented by the accompanying drawing which constitutes a part of this application and in which, Figure 1 is a fragmentary top plan view of an automobile showing the application of the invention; Fig. 2 is an enlarged plan view of the carbureter of the automobile and the improved parts applied thereto; and Fig. 3 is a side elevation of the carbureter and other parts seen in Fig. 2.

In specifically describing the invention shown in the drawings above briefly described, similar reference characters will be placed on corresponding parts throughout the several views and reference will be herein made to the numerous elements by their respective indices. To this end, A represents an automobile whose engine E is equipped with the usual carbureter C whose upright throttle valve stem S is equipped with the common type of L-shaped crank L movable in a horizontal plane and having in the free end of its longer arm an eye which usually receives the downturned end E' of a hand actuated operating rod R whose control member is positioned contiguous to the steering wheel W. The shorter arm of the crank L is equipped with a set screw or the like s adapted to abut a stop s' on the carbureter C to limit the movement of said crank.

All of the parts so far briefly described are of common construction, the end E' of the rod R being usually received in the eye E, whereby endwise shifting of said rod by the operator will adjust the throttle valve by properly turning its stem S. When using my improved accelerator, however, the end E' is removed from the eye E and is received in the arcuate slot 1 formed in a flat horizontal plate 2 which overlies the crank L, a bolt or the like 3 being passed through said plate and through the eye E, while an additional bolt 4 passes through said plate and through the shorter arm of the crank. The plate 2 is preferably of approximately triangular shape having two of its sides positioned at right angles to each other, while its third side is curved to conform to the curvature of the slot 1, the latter being disposed concentric with the stem S.

In addition to the features above described, the plate 2 is formed with a circular opening 5 preferably disposed at one of its corners and in close proximity to one end of the slot 1, said opening receiving therein the downturned front end 6 of a foot actuated supplemental operating rod 7 whose rear end carries an appropriate head 8 to be engaged by the foot of the operator. The end 6 of the rod 7 is formed with an aperture into which one end of a coiled spring 9 is hooked, the other end of said spring being anchored at an appropriate point, preferably to one of the bolts on the transmission housing (not shown). Thus, the spring 9 exerts its tension to normally retain the stop screw s in contact with the stop s', to hold the crank L in the position at which the throttle valve is partially closed as it normally stands. In addition to this use of the spring, however, it serves to prevent disconnection of the rod 7 and plate 2.

With the parts constructed as above described, forward movement of the rod 7 by engagement of the operator's foot with the head 8 thereof, will so shift the plate 2 and crank L as to open the throttle valve the desired amount. It is to be observed that this operation takes place without moving the rod R or the means for shifting said rod by hand, this being allowed by the provision of the slot 1. The rod 7 passes slidably through a circular attaching plate 11, the latter being composed of two sections notched on their meeting edges for the reception of said rod as clearly shown in Fig. 1, the plate in question being secured by screws or the like to the inclined portion of the automobile floor.

From the foregoing description, taken in connection with the accompanying drawings, it will be obvious that I have provided an extremely simple and inexpensive attachment for accomplishing the desired results, and that the construction of the parts with which the improvements coöperate need not be changed in any manner whatsoever in applying such improvements to use.

I claim:—

1. The combination with the upright throttle valve stem of a carbureter, a horizontal L-shaped operating crank secured at its angle to said stem and having in the free end of its longer arm an eye, and a horizontally extending hand-actuated operating rod having a downturned end; of a sheet metal plate overlying the crank and having an arcuate slot concentric with the valve stem and receiving therein the downturned end of the operating rod, a fastener passing through the plate and the eye, a second fastener passing through said plate and through another part of the crank, a supplemental foot-actuated operating rod pivoted to the plate, and a spring for yieldably holding said plate in one position.

2. The combination with the upright throttle valve stem of a carbureter, a horizontal L-shaped operating crank secured at its angle to said stem and having in the free end of its longer arm an eye, and a horizontally extending hand-actuated operating rod having a downturned end; of a sheet metal plate overlying the crank and having an arcuate slot concentric with the valve stem and receiving therein the downturned end of the operating rod, said plate also having a circular opening adjacent one end of the slot, a fastener passing through the plate and the eye, a second fastener passing through said plate and through another part of the crank, a supplemental foot-actuated operating rod having an apertured downturned end received in the aforesaid circular opening, and a coiled spring having one of its ends hooked in the aperture, the other end of said spring being anchored.

3. A foot accelerator attachment for use in connection with the throttle valve operating crank of a carbureter and the manual control rod for said crank, said attachment comprising a plate to be secured to said crank, said plate having an arcuate slot to be positioned concentric with the pivot of the crank, said slot being provided for the purpose of slidably connecting the aforesaid manual control rod with the plate, a foot actuated operating rod pivoted to said plate, and a spring for holding said plate in a single normal position.

4. A foot accelerator attachment for use in connection with the throttle valve operating crank of a carbureter and the manual control rod for said crank, said attachment comprising a plate to be secured to said crank, said plate having an arcuate slot and an aperture both of which extend therethrough, said slot being adapted to be positioned concentric with the pivot of the crank and being provided for the purpose of establishing a sliding connection between the aforesaid control rod and the plate, a foot actuated control rod having one end bent laterally through the aforesaid aperture, the terminal of said laterally bent end having an opening formed therethrough, and a spring having one end secured in said opening, said spring serving to retain the plate in a single normal position and also to prevent removal of said foot actuated rod.

In testimony whereof I have hereunto set my hand in presence of two subscribing witnesses.

ARNO A. EWALD.

Witnesses:
  W. E. BRISTOL,
  MABEL E. MORGAN.